US012726696B2

(12) United States Patent
Li et al.

(10) Patent No.: US 12,726,696 B2
(45) Date of Patent: Sep. 1, 2026

(54) ZOOMING METHOD AND APPARATUS WITH CONSISTENT TARGET POSITION WHILE SWITCHING CAMERAS

(71) Applicant: SZ DJI TECHNOLOGY CO., LTD., Shenzhen (CN)

(72) Inventors: Chen Li, Shenzhen (CN); Guang Li, Shenzhen (CN); Wen Zou, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/613,779

(22) Filed: Mar. 22, 2024

(65) Prior Publication Data

US 2024/0267613 A1 Aug. 8, 2024

Related U.S. Application Data

(63) Continuation of application No. PCT/CN2021/120423, filed on Sep. 24, 2021.

(51) Int. Cl.
*H04N 23/63* (2023.01)
*H04N 23/67* (2023.01)
(Continued)

(52) U.S. Cl.
CPC ......... *H04N 23/632* (2023.01); *H04N 23/675* (2023.01); *H04N 23/69* (2023.01); *H04N 23/815* (2023.01); *H04N 23/90* (2023.01)

(58) Field of Classification Search
CPC .... H04N 23/632; H04N 23/675; H04N 23/69; H04N 23/815; H04N 23/90; H04N 23/45; H04N 23/695
(Continued)

(56) References Cited

U.S. PATENT DOCUMENTS 5,754,230 A * 5/1998 Tsuruta .................. H04N 5/272 348/565
6,757,008 B1 * 6/2004 Smith ...................... H04N 7/18 348/169
(Continued)

FOREIGN PATENT DOCUMENTS

CN 108111818 A 6/2018
CN 110493525 A 11/2019
(Continued)

OTHER PUBLICATIONS

International Search Report and Written Opinion mailed on Jun. 22, 2022, received for PCT Application PCT/CN2021/120423, filed on Sep. 24, 2021, 8 pages including English Translation.

*Primary Examiner* — Usman A Khan
(74) *Attorney, Agent, or Firm* — ANOVA LAW GROUP, PLLC

(57) ABSTRACT

A method of zooming an image capturing device may comprise outputting a first image collected by a first camera of an image capturing device, wherein the first camera has a first focal length; controlling switching of the current focal length of the image capturing device from the first focal length supported by the first camera to a second focal length supported by a second camera of the image capturing device; and outputting a second image collected by the second camera while maintaining a position of a target object in the second image to be the same as a position of the target object in the first image. The first focal length and the second focal length are not identical.

20 Claims, 6 Drawing Sheets

(51) Int. Cl.

| | |
|---|---|
| ***H04N 23/69*** | (2023.01) |
| ***H04N 23/80*** | (2023.01) |
| ***H04N 23/90*** | (2023.01) |

(58) Field of Classification Search

USPC ........................................................ 348/240.3

See application file for complete search history.

(56) References Cited

U.S. PATENT DOCUMENTS

| | | | | |
|---|---|---|---|---|
| 6,977,676 | B1 * | 12/2005 | Sato | H04N 7/142 348/E7.086 |
| 7,292,264 | B2 * | 11/2007 | Itokawa | G01S 3/7864 348/E7.086 |
| 7,305,180 | B2 * | 12/2007 | Labaziewicz | H04N 23/55 396/85 |
| 7,593,036 | B2 * | 9/2009 | Shiraki | H04N 5/262 396/311 |
| 9,225,947 | B2 * | 12/2015 | Lee | H04N 23/64 |
| 9,491,359 | B2 * | 11/2016 | Hayashi | H04N 23/68 |
| 9,807,314 | B2 * | 10/2017 | Jung | H04N 5/262 |
| 2002/0152557 | A1 * | 10/2002 | Elberbaum | H04N 23/54 348/E7.086 |
| 2003/0020814 | A1 * | 1/2003 | Ono | H04N 23/00 348/E5.042 |
| 2003/0160886 | A1 * | 8/2003 | Misawa | H04N 23/45 348/240.1 |
| 2005/0100087 | A1 * | 5/2005 | Hasegawa | H04N 7/181 348/E7.086 |
| 2006/0115185 | A1 * | 6/2006 | Iida | H04N 5/2628 |
| 2007/0064141 | A1 * | 3/2007 | Misawa | H04N 23/54 348/E5.045 |
| 2007/0064142 | A1 * | 3/2007 | Misawa | H04N 23/69 348/E5.045 |
| 2007/0103577 | A1 * | 5/2007 | Misawa | H04N 23/45 348/E5.045 |
| 2010/0141803 | A1 * | 6/2010 | Jung | H04N 23/60 348/E5.051 |
| 2011/0242369 | A1 * | 10/2011 | Misawa | H04N 23/45 348/240.2 |
| 2012/0268641 | A1 * | 10/2012 | Kazama | H04N 23/45 348/E5.051 |
| 2012/0320193 | A1 * | 12/2012 | Lienhart | G02B 23/105 348/135 |
| 2013/0265466 | A1 * | 10/2013 | Jung | H04N 5/262 345/629 |
| 2014/0036089 | A1 * | 2/2014 | Nishiura | H04N 23/661 348/159 |
| 2016/0191812 | A1 * | 6/2016 | Tsubusaki | H04N 23/69 348/240.1 |
| 2019/0082101 | A1 * | 3/2019 | Baldwin | H04N 23/635 |
| 2019/0096047 | A1 * | 3/2019 | Ogasawara | G06T 5/70 |
| 2020/0314309 | A1 * | 10/2020 | Kitaura | H04N 23/80 |
| 2022/0394190 | A1 * | 12/2022 | Cui | H04N 23/635 |
| 2023/0101516 | A1 * | 3/2023 | Mizuma | H04N 23/695 348/333.03 |

FOREIGN PATENT DOCUMENTS

| | | | |
|---|---|---|---|
| CN | 111641775 | A | 9/2020 |
| CN | 111654631 | A | 9/2020 |
| JP | 2000115619 | A | 4/2000 |
| WO | 2021/043172 | A1 | 3/2021 |

* cited by examiner

ZOOMING METHOD AND APPARATUS WITH CONSISTENT TARGET POSITION WHILE SWITCHING CAMERAS

CROSS-REFERENCE TO RELATED APPLICATION

The present application is a continuation of International Application No. PCT/CN2021/120423, filed Sep. 24, 2021, which is incorporated herein by reference in its entirety.

TECHNICAL FIELD

The present application relates to the field of photographic technology, and specifically to a zoom method and apparatus for an image capture device.

BACKGROUND

For image acquisition devices that include multiple cameras with different focal lengths, when the cameras are switched with the change of focal lengths, there is a problem of screen jumping or shooting target being lost. For example, the Field of Views (FOVs) of the cameras with different focal lengths are different, and the screen jumping phenomenon occurs. When shooting with a short-focus camera, the target may be in the center of the screen, but when switching to a telephoto camera, the target may jump to the edge of the screen, resulting in the phenomenon of screen jumping. Alternatively, when shooting with a short-focus camera, the target is in the middle of the screen, but when switching to a telephoto camera, the target may not be in the screen, resulting in the loss of the target. This situation requires the user to re-adjust the position or angle of the camera, re-configure the picture or look for the target, which seriously affects the user's experience.

SUMMARY

One embodiment of the present disclosure is a method of zooming an image capturing device, comprising: adjusting a current focal length of the image capturing device to a first focal length supported by a first camera of the image capturing device; capturing and outputting a first image collected by the first camera; controlling switching of the current focal length of the image capturing device from the first focal length supported by the first camera to a second focal length supported by a second camera of the image capturing device, and capturing and outputting a second image collected by the second camera while maintaining a position of a target object in the second image to be the same as a position of the target object in the first image, wherein the first focal length and the second focal length are not identical.

Another embodiment of the present disclosure is an apparatus for zooming an image capture device, comprising at least one processor, and at least one memory, the memory storing a computer program executable by the processor, the processor executing the computer program to perform the following: controlling the current focal length of the image capture device to be a first focal length supported by a first camera of the image capture device and controlling the first camera to capture a first image; controlling the current focal length of the image acquisition device to switch from the first focal length supported by the first camera to a second focal length supported by a second camera of the image acquisition device, and controlling the second camera to capture a second image while maintaining a position of the target object in the second image to be the same as a position of the target object in the first image, wherein the first focal length supported by the first camera is not exactly the same as the second focal length supported by the second camera.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
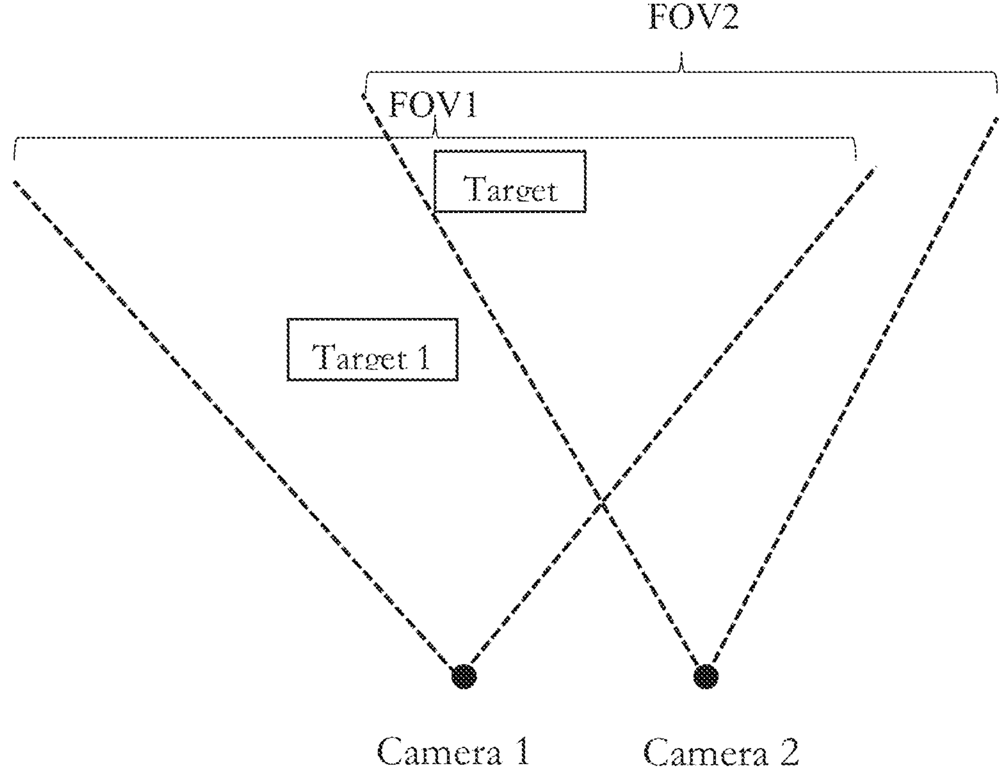
FIG. 1 is a schematic FOV diagram of an image acquisition device having a plurality of cameras according to an embodiment of the present application.

The technical solutions in the embodiments of the present application will be described clearly in the following in conjunction with the accompanying drawings in the embodiments of the present application, and it is obvious that the described embodiments are only a part of the embodiments of the present application and not all of the embodiments. Based on the embodiments in this application, all other embodiments obtained by a person of ordinary skill in the art without making creative labor fall within the scope of protection of this application.

When zooming the image acquisition device, there are two types of zoom: optical zoom or digital zoom. Among them, the optical zoom is to adjust the focal length of the image acquisition device, so that the image of the object in the image acquisition device is enlarged or reduced, and the optical zoom is only applicable to the image acquisition device with adjustable focal length. Digital zoom is realized by up-sampling or down-sampling the image to enlarge or reduce the image, thereby obtaining images with different zoom magnifications. For digital zoom, if the zoom magnification exceeds a certain range, the zoomed image will be blurred and have poor image quality. For example, for a certain frame, using digital zoom to magnify the image by 1× may still be clear, but if you magnify it by 5×, it will be blurred and the picture quality will be very poor.

In order to solve the problem of poor picture quality of images obtained using digital zoom, there is provided a technique of relay zooming using a plurality of cameras, i.e., an image acquisition device may be provided with a plurality of cameras, the focal lengths of which may be different, so that in the process of zooming of the image acquisition device by a user, the camera may be switched to a camera whose focal length matches the focal length indicated by the zoom command input by the user, so as to utilize the switched camera to perform image acquisition with the zoom command. As such, the image acquisition device can support a larger range of focal lengths, and the image obtained in the zoom process is relatively high in clarity and has a better picture quality.

However, for this kind of image acquisition device which includes multiple cameras with different focal lengths, with the change of focal length, when the cameras are switched, there will be the problem of the screen jumping or the shooting target being lost. For example, the Field of Views (FOVs) of the cameras with different focal lengths are not the same, and the shorter the focal length of the camera is, the bigger the FOV is, and thus when shooting with a short-focused camera, the target may be located in the center of the screen, and when switching to a telephoto camera, the target may jump to the edge of the screen, resulting in the phenomenon of screen jumping. Alternatively, when using a short-focus camera, the target is in the center of the screen, and when switching to a telephoto camera, the target may no longer be in the screen due to the small FOV, resulting in the loss of the target.

For example, as shown in FIG. 1, the viewpoint of camera 1 is FOV1 and the viewpoint of camera 2 is FOV2. When switching from camera 1 to camera 2, target 1 will disappear from the screen and target 2 will jump from the center of the screen to the leftmost end of the screen. This situation requires the user to re-adjust the position or angle of the camera, reconfigure the picture or look for the target, which seriously affects the user's experience.

Based on this, some embodiments of the present disclosure provide a zooming method of an image acquisition device, the image acquisition device comprising at least two cameras, the at least two cameras supporting focal lengths that are not identical. During the zooming process, when a zoom command input by a user indicates that the focal length of the image acquisition device is switched from the focal length supported by one of the cameras (camera 1) to the focal length of the other camera (camera 2), the camera 2 can be controlled to work, and the camera 2 can be utilized to acquire an image. In order to avoid that the switching of the cameras leads to the phenomenon of a screen jumping or a loss of a shooting target in the image acquired before and after, the position of the camera 2 can be automatically adjusted before capturing the image and outputting it, or the image captured by the camera 2 can be processed in a certain manner before outputting it, so that the position of the target to be photographed in the output image is basically the same as the position of the target to be photographed in the image captured by the camera 1. As such, the target to be photographed does not appear to be jumped or lost in the two continuous frames of the images displayed to the user.

The image acquisition device of some embodiments of the present application may be various devices equipped with at least two cameras, such as, for example, a cell phone, a camera, a gimbal, a drone, an unmanned cart, and the like. In some embodiments, a user interaction interface may be included in the image acquisition device, and images acquired by the image acquisition device may be displayed in the user interaction interface for viewing by the user. In some embodiments, the image acquisition device may be communicatively connected to a control terminal, and the image acquisition device may send the acquired images to the control terminal for display in the interactive interface of the control terminal for viewing by the user. For example, the images captured by the drone are sent to the user's cell phone for viewing by the user.

In one embodiment, the image acquisition device may include two or more cameras with focal lengths that are not identical, and the switching process between any two cameras during the zooming process is substantially the same. The switching process between any two cameras in the zooming process of the image acquisition device is described below as an example.

In one embodiment, the image acquisition device includes at least a first camera and a second camera, the first camera supporting a focal length that is not exactly the same as the focal length supported by the second camera. Wherein the first camera and the second camera may be both fixed-focus cameras, or both zoom cameras, or one fixed-focus camera and one zoom camera. The focal lengths not being exactly the same means that the ranges of the focal lengths supported by the first camera and the second camera are partially the same or completely different.

When the user is utilizing the image acquisition device to acquire an image, a default camera can be turned on first for image acquisition, and if the user inputs a zoom command, whether to switch the cameras can be determined based on the focal length indicated by the zoom command. For example, if the first camera has a focal length of 3 mm and the second camera has a focal length of 5 mm, when the user inputs the image acquisition command, the first camera will be turned on by default, and the first camera will be utilized for image acquisition. But of course when the user inputs the zoom command to adjust the focal length of the image acquisition device to 5 mm or to a focal length close to 5 mm (e.g., 4.8 mm), the camera will be switched to the second camera, and the second camera will be utilized to acquire the image.

Figure 2:
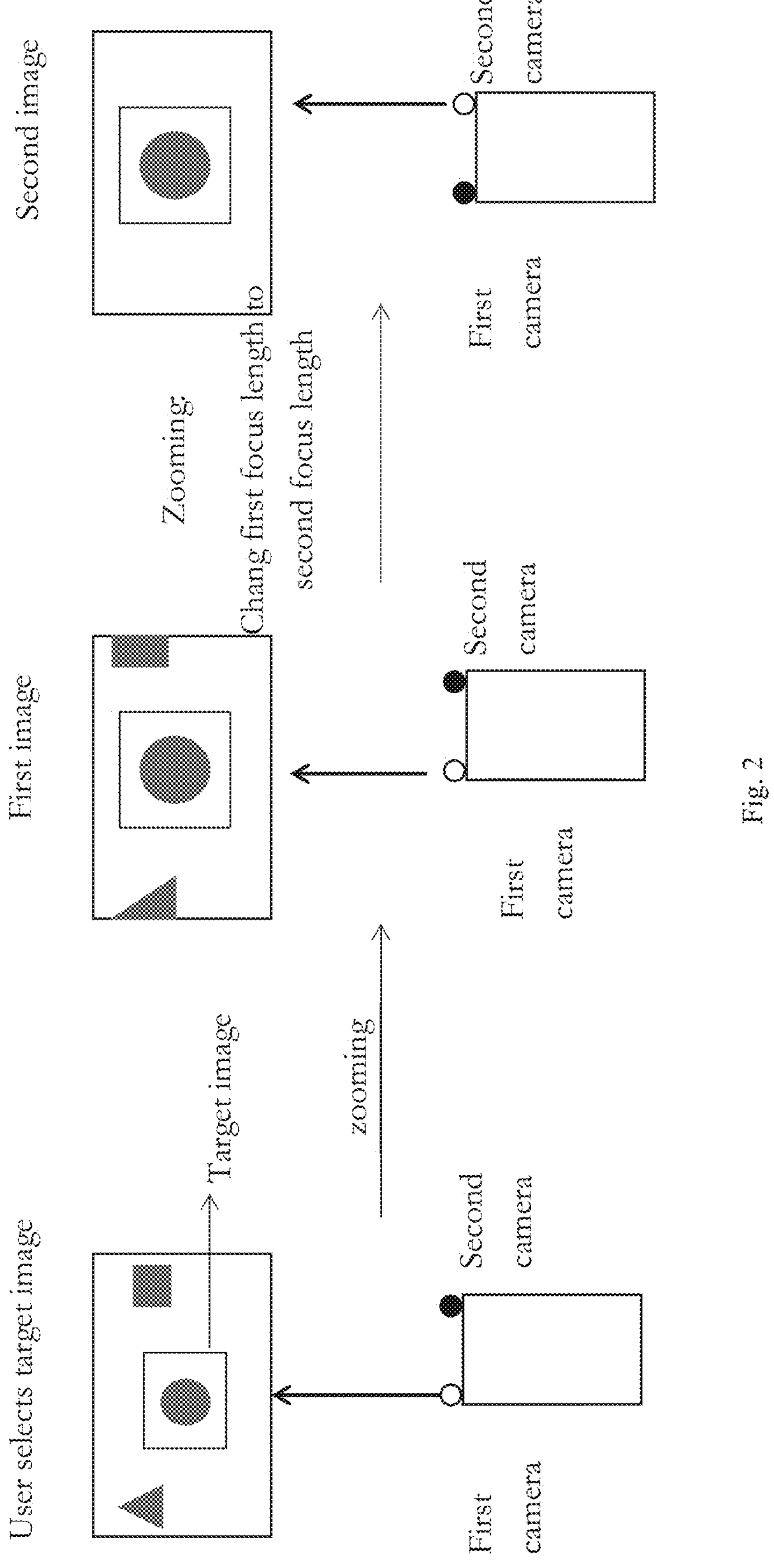
FIG. 2 is a schematic diagram of a zoom method of an image acquisition device according to an embodiment of the present application.

As shown in FIG. 2, a schematic diagram of the zooming method provided by an embodiment of the present application, it should be pointed out that FIG. 2 is only a schematic example of explaining the zooming method of the present application, and the zooming method of the present application is not limited to FIG. 2. Usually, the user zooms in order to zoom out or zoom in on a certain target object or certain target objects for convenient viewing of the target objects, so that the user, before inputting the zoom command, can first input the target object selecting command in a user interaction interface before inputting the zoom command. Accordingly, the user can input the target object selection command in the user interaction interface to select the target object to be zoomed. For example, the user may click on a certain object in the image displayed in the user interaction interface, or select a certain object as the target object.

In the case where the current focal length of the image acquisition device is a focal length supported by the first camera, a first image acquired through the first camera may be output to display the first image to the user through the user interaction interface. In the case where the current focal length of the image acquisition device is switched from the focal length supported by the first camera to the focal length supported by the second camera, a second image acquired through the second camera may be output to display the second image to the user through the user interaction interface. In order to avoid the screen from jumping or the target from being lost, the position of the target object in the second image may be controlled to be the same as the position of the target object in the first image. It should be noted that the same position does not mean that the position of the target object in the two frames output before and after needs to be exactly the same, but is substantially the same. For example, the position of the target object in the two images can be completely consistent, there can also be a small offset, as long as the positional deviation of the target object in the two images is controlled within a certain range, to ensure that the user does not feel that the position of the target object in the two images jumps. By controlling the positions of the target object in the before and after output of the two frames of the image to be generally consistent, so that when the camera is switched, the user is presented with the before and after two frames of the image, the position of the target object in the screen does not change much, and will not appear to jump or avoiding the target loss problem.

In some embodiments, where both the first camera and the second camera are fixed-focus cameras, the focal length supported by the first camera is different from the focal length supported by the second camera. For example, the first camera has a focal length of 5 mm and the second camera has a focal length of 7.5 mm.

In some embodiments, the first camera and the second camera are both zoom cameras, and each of the first camera and the second camera supports one or more focal lengths. For example, the first camera supports a focal length of 7.5 mm-10 mm and the second camera supports a focal length of 12.5 mm-15 mm.

In some embodiments, if both the first camera and the second camera are zoom cameras, the focal lengths supported by the two cameras can be seamlessly spliced together or partially overlapped, i.e., the focal lengths supported by both are partially the same. For example, the first camera supports a focal length of 7.5 mm-10 mm, and the second camera supports a focal length of 10 mm-15 mm, and the two supported focal lengths can be seamlessly spliced together. In another example, the first camera supports a focal length of 5 mm-10 mm, the second camera supports a focal length of 7.5 mm-15 mm, and the two supported focal lengths can have a partially overlapping area i.e. 7.5 mm-10 mm.

In some embodiments, if the focal lengths supported by the first camera and the focal lengths supported by the second camera are seamlessly spliced, the first camera and the second camera have at least partially overlapping viewing angles when the first camera and the second camera have the same focal length. As an example, assuming that the focal length supported by the first camera is 7.5 mm-10 mm, and the focal length supported by the second camera is 10 mm-15 mm, then when the focal length of the first camera is 10 mm, and the focal length of the second camera is also 10 mm, there exists at least a partially overlapping viewing angle of the two cameras to ensure that when switching from the first camera to the second camera, some of the objects within the field of view of the first camera are also within the field of view of the second camera.

Of course, during the user zooming process, the focal length may become larger or smaller, and thus, the switching of the camera may be either from a telephoto camera to a short-focus camera to zoom in on the target object or from a short-focus camera to a telephoto camera to zoom out on the target object. Therefore, in some embodiments, the focal length supported by the first camera is not greater than the focal length supported by the second camera, and the zoom command may be a command instructing to switch the current focal length of the image capture device from the maximum local length supported by the first camera to the minimum focal length supported by the second camera. For example, the focal length supported by the first camera is 5 mm-10 mm and the focal length supported by the second camera is 12.5-15 mm, and the zoom command may be a command to switch the focal length of the image capture device from 10 mm to 12.5 mm.

In some embodiments, the focal length supported by the first camera is not smaller than the focal length supported by the second camera, and the zoom command may be a command that instructs to switch the focal length of the image capture device from a minimum focal length supported by the first camera to a maximum focal length supported by the second camera. For example, the first camera supports a focal length of 12.5-15 mm and the second camera supports a focal length of 5 mm-10 mm, and the zoom command may be an command to switch the focal length of the image capture device from 12.5 mm to 10 mm.

In some embodiments, the first camera may be a fixed-focus camera, and the first image may be an original image captured by the first camera, hereinafter referred to as the first original image, or the first image may be an image obtained by performing an image transformation process on the first original image.

In some embodiments, the first image may be obtained by performing one or more of an up-sampling process, a down-sampling process, or a cropping process on the first original image captured by the first camera.

As an example, assuming that the focal length of the first camera is 3 mm and the focal length of the second camera is 5 mm, if the zoom command input by the user instructs to adjust the focal length of the image acquisition device to 3 mm, the first original image captured by the first camera can be directly output and displayed to the user in the user interaction interface. If the zoom command input by the user indicates that the focal length of the image acquisition device is to be adjusted to 3.5 mm, the first original image acquired by the image acquisition device can be up-sampled to obtain the first image, and then the first image is displayed in the user interaction interface for the user to view. If the zoom command input by the user at this time indicates that the focal length of the image acquisition device is to be adjusted to 2.5 mm, the first original image acquired by the image acquisition device can be down-sampled to obtain the first image, and then the first image is displayed in the user interaction interface. When the zoom command indicates that the focal length of the image acquisition device is 5 mm or close to 5 mm, then the second camera can be utilized to acquire the image and output it.

In some embodiments, in order to facilitate the user to view the target object, the target object can be kept at a fixed position, for example, the center position, of the screen all the time during the zooming process. After the first original image is captured by the camera, the first original image can be up-sampled or down-sampled first, and then the up-sampled or down-sampled processed image can be cropped to obtain the first image so that the target object is located at a fixed position, e.g., a center position, of the first image, and then display the first image to the user.

After the camera is switched from the first camera to the second camera, in order to ensure that the images captured by the two cameras do not jump or the target object is not lost, the position of the target object in the second image can be controlled to be substantially the same as the position of the target object in the first image.

In some embodiments, if the image acquisition device is mounted on a gimbal, in order to control the position of the target object in the second image to be substantially the same as the position of the target object in the first image, a target position of the second camera may be determined based on the relative attitude relationship between the first camera and the second camera. When the second camera is in the target attitude, the position of the target object in the original image collected by the second camera (hereinafter referred to as the second original image) is not much different from the position of the target object in the first image. Then, the gimbal can be controlled to rotate to automatically adjust the second camera to the second attitude, collect the second original image and output it. In this manner, since the position of the image acquisition device is to be adjusted by controlling the gimbal, the processing efficiency will be slow, and in a scenario in which the user switches frequently, such as when the user repeatedly switches the focus of the image acquisition device between the focus of the first camera and the focus of the second camera, the user commands will not be responded to in a timely manner.

In order to overcome the above problem, in some embodiments, in order to control the position of the target object in the second image to be substantially the same as the position of the target object in the first image, the second original image acquired by the second image acquisition device may also be subjected to a certain amount of processing, so that the processed image meets the above requirements before being output. For example, a second original image captured by the second camera may be acquired, and then an image transformation process may be performed on the second original image to obtain the second image, and by performing the image transformation process on the second original image, it may be ensured that a deviation between the position of the target object in the second image and the position of the target object in the first image is less than a predetermined deviation.

In some embodiments, when performing a second image transformation process on the second original image to obtain the second image, a mapping relationship between the first image and the second original image may first be determined based on the relative positional and postural relationship between the first camera and the second camera, and then an image transformation process may be performed on the second original image based on the position of the target object in the first image and the mapping relationship to obtain the second image. Wherein, the relative positional and postural relationship between the first camera and the second camera may be calibrated at the factory or may also be temporarily calibrated during use, and after determining the relative positions and postures (i.e., external parameter) of the first camera and the second camera, a mapping relationship characterizing the pixel points of the images captured by the two cameras may be determined in conjunction with internal references between the two cameras, such as the univariate responsivity matrix H. Then, the position of the target object in the second image can be determined based on the position of the target object in the first image, and based on the position of the target object in the first image, a certain transformation process can be performed on the second image, such as cropping. etc., so that the position of the target object in the second image is not much different from the position in the first image.

In some embodiments, the mapping relationship may be determined directly based on the internal and external parameters of the first camera and the second camera. Of course, since the mapping relationship of the position of the object in the three-dimensional space in the images captured by the two cameras is related to the distance of the object from the cameras, in some embodiments, in order to determine the mapping relationship more accurately, a distance between the target object and the image capturing device may be determined first. For example, if the image capturing device comprises a range-finding device, the range-finding device may be utilized to measure the distance. Alternatively, the distance can be determined using the parallax of the images collected by the two cameras of the target object, and then the mapping relationship can be determined based on the relative positional and postural relationship between the first camera and the second camera and the distance.

In some embodiments, image transformation processing of the second original image may be one or more of affine transformation processing (e.g., if the target object is tilted in the second image, it may be straightened by affine transformation), perspective transformation processing, cropping processing, or the like, of the second original image.

Since the output second image is an image after the transformation processing of the second original image acquired by the second camera, the position of the target object in the second image is not the actual imaging position of the target object. Thus, in some embodiments, if the image acquisition device is mounted on a gimbal, after outputting the second image, the gimbal may be controlled to move to drive the image acquisition device to move, so that the actual imaged position of the target object in the second camera is the same as the position of the target object displayed in the second image.

For example, assume that the original target object is located in the center of the first image. After switching the camera to the second camera, the target object is located on the left side of the second original image collected by the second camera. At this time, in order to avoid the image jumping, the second original image can be cropped to obtain the second image so that the target object is still in the center of the second image. However, since the target object is actually on the left side of the field of view of the second camera, in order to keep the actual imaging position consistent with the displayed position, the gimbal can be controlled to rotate to adjust the posture of the second camera so that the target object is located in the center of the second camera's field of view. By first processing the image captured by the second camera, the position of the target object is made to deviate less from the position of the target object in the previous frame of the image, so that the phenomenon of jumping or target loss does not occur, and then by automatically adjusting the position of the second camera, the actual imaging position of the target object in the second camera is adjusted to be the same as the displayed position in absence of perception by the user.

In some embodiments, if the image acquisition device is not mounted on a gimbal, i.e., it is not possible to adjust the position of the image acquisition device by automatically adjusting the gimbal to enable the actual imaging position being the same as the position displayed in the second image. In this case, after the second image is output, if the user continues to input zoom instructions, in order to allow the user to perceive that the target object is not located at the actual displayed position at this time, multiple frames of second original images subsequently collected by the second camera can be processed and then output, so that the position of the target object in the multiple frames of processed second original images is gradually restored from the position of the target object in the second image to the actual imaging position of the target object by the second camera. As such, there is a gradual change process by gradually adjusting the target object to its actual position, and there will be no jumping phenomenon.

In one embodiment, the target object is located at the center of the first image, and after switching the camera to the second camera, the target object is located on the left side of the second original image collected by the second camera. At this time, in order to avoid the screen jumping, the second original image can be cropped to get the second image so that the target object is still at the center of the screen of the second image. However, the target object is actually on the left side of the second camera's field of view. If the user continues to zoom in, for example, to enlarge the image, the target object may not be in the field of view of the camera at all during the next camera switching process. In order to avoid such a situation, the position of the target object in the output image can be gradually adjusted during the user's continued zooming process, so as to make it gradually return to its real position, for example, the left side of the screen so that the user can adjust the position of the image acquisition device to readjust the target object to the center of the screen after seeing the image.

In order to avoid the problem that the target object may not be within the FOV of the second camera after the camera is switched from the first camera to the second camera during the user's zooming process, resulting in the loss of the target object, before zooming the image capturing device, the position of the image capturing device may be adjusted so that the target object is located within the FOVs of both the first camera and the second camera.

Figure 3:
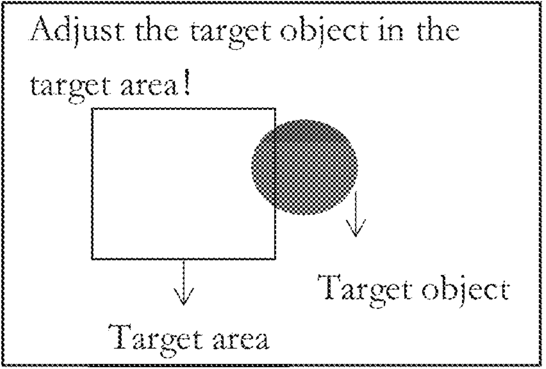
FIG. 3 is a schematic diagram of prompting a user to adjust a target object to a target area according to an embodiment of the present application.

In some embodiments, as shown in FIG. 3, before zooming the image acquisition device, a target area may be identified in the user interaction interface, and voice or text messages may be utilized to prompt the user to adjust the position of the image acquisition device so that the target object is located in the target area, wherein when the target object is located in the target area, the target object is located in the FOV of the second camera. For example, it may be determined, based on the relative positional and postural relationship between the first camera and the second camera, a region of the image captured by the first camera, and when the target object is located in the region, it also appears in the image captured by the second camera. The region may then be identified, e.g., it may be boxed out, to prompt the user to adjust the position of the image capturing device such that the target object is located within the target region.

In some embodiments, if the image acquisition device is mounted on a gimbal, before zooming the image acquisition device, a range of the second camera's postures at which the second camera can acquire the target object can be determined based on the relative positional and postural relationship between the first camera and the second camera, and then the movement of the gimbal can be controlled to adjust the posture of the image acquisition device, so that the target object is located within the second camera's FOV.

By doing the above, it is possible to ensure that there is no problem of target loss when camera switching occurs.

Usually, when multiple cameras are set up, in order to save space, the positions between the multiple cameras are not too far apart, so when the target object is in the center of the view of a certain camera, after switching from that camera to the next camera, it will generally be in the view of the next camera. Therefore, in some embodiments, the user can adjust the target object to the center of the screen before zooming. For example, the target object is located in the center of the first image, and when switching the camera to the second camera, the target object can also be controlled to be located in the center of the second image.

In some embodiments, if the image acquisition device is mounted on a gimbal, after outputting the second image, the gimbal can also be controlled to move to drive the image acquisition device to move, so that the target object is always at the center of the second original image acquired by the second camera. In this way, it can be ensured that the target object is always in the center of the image, which is convenient for the user to view, and even when the user continues to input the zoom command and the focus of the image acquisition device is switched from the focus of the second camera to the focus of the next camera, it can also be ensured that the target object is in the FOV of the next camera.

In some embodiments, the current focal length of the image acquisition device is determined based on a zoom command input by the user, and the zoom command may be input through a control on the image acquisition device or a control terminal for controlling the image acquisition device. For example, in the case where the image capturing device is a cell phone or a camera, the zoom command may be input via a control set in the cell phone or the camera, and in the case where the image capturing device is a drone, the zoom command may be input via a control set on the control terminal of the drone.

In order to further explain the zooming method in some embodiments of the present application, the following is explained in connection with a specific embodiment.

Figure 4:
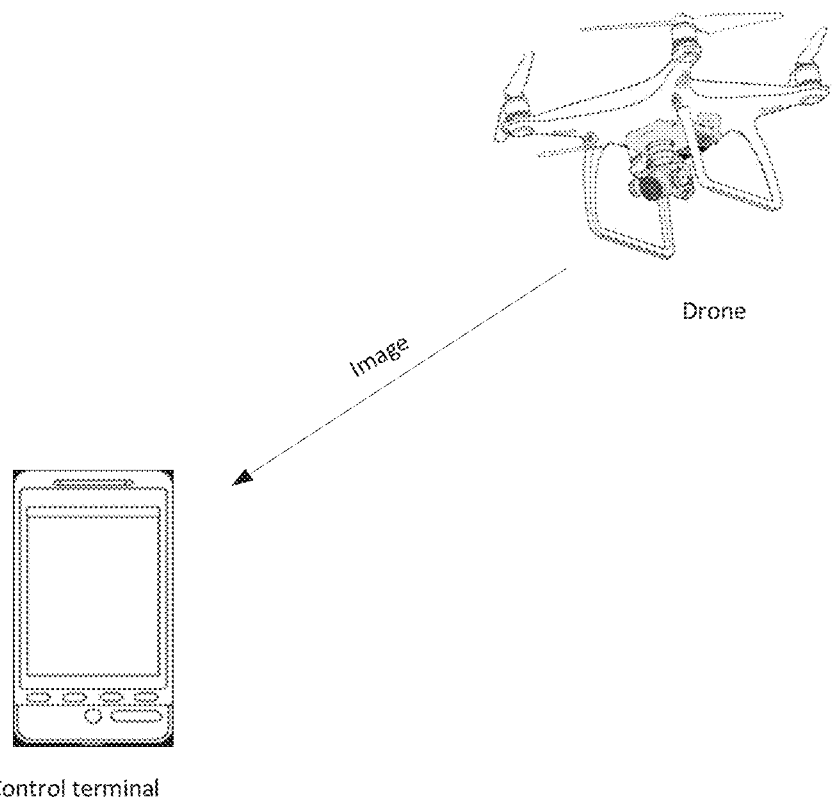
FIG. 4 is a schematic diagram of an application scenario according to an embodiment of the present application.

A drone is usually used in forest fire prevention, electric power maintenance, road and bridge maintenance and other scenes. In order to allow the drone to clearly photograph the target object to be detected and repaired, a plurality of cameras can be set up on the drone. The plurality of cameras can be fixed-focus cameras or zoom cameras, and the focal lengths of the plurality of cameras are not exactly the same. Among other things, the plurality of cameras may be mounted on gimbals, and the position of the plurality of cameras may be adjusted by the gimbals. As shown in FIG. 4, the drone may be communicatively connected to a control terminal, and may send the collected images to the control terminal for viewing by a user. In the zooming process, when camera switching occurs, there is a problem that the image jumps or the target object is lost. In order to solve this problem, this embodiment provides a zooming method.

The following is an example of a fixed-focus camera. Assuming that there is a short-focus camera (with a focal length of 3 mm) and a telephoto camera (with a focal length of 5 mm) in the drone, the short-focus camera has a wider range of FOV. When the camera is turned on by default, the short-focus camera can be turned on, and then the short-focus camera can be used to locate the target object that the user wants to observe. Then, the short-focus camera is switched to the telephoto camera to zoom in and observe the target object.

Figure 5:
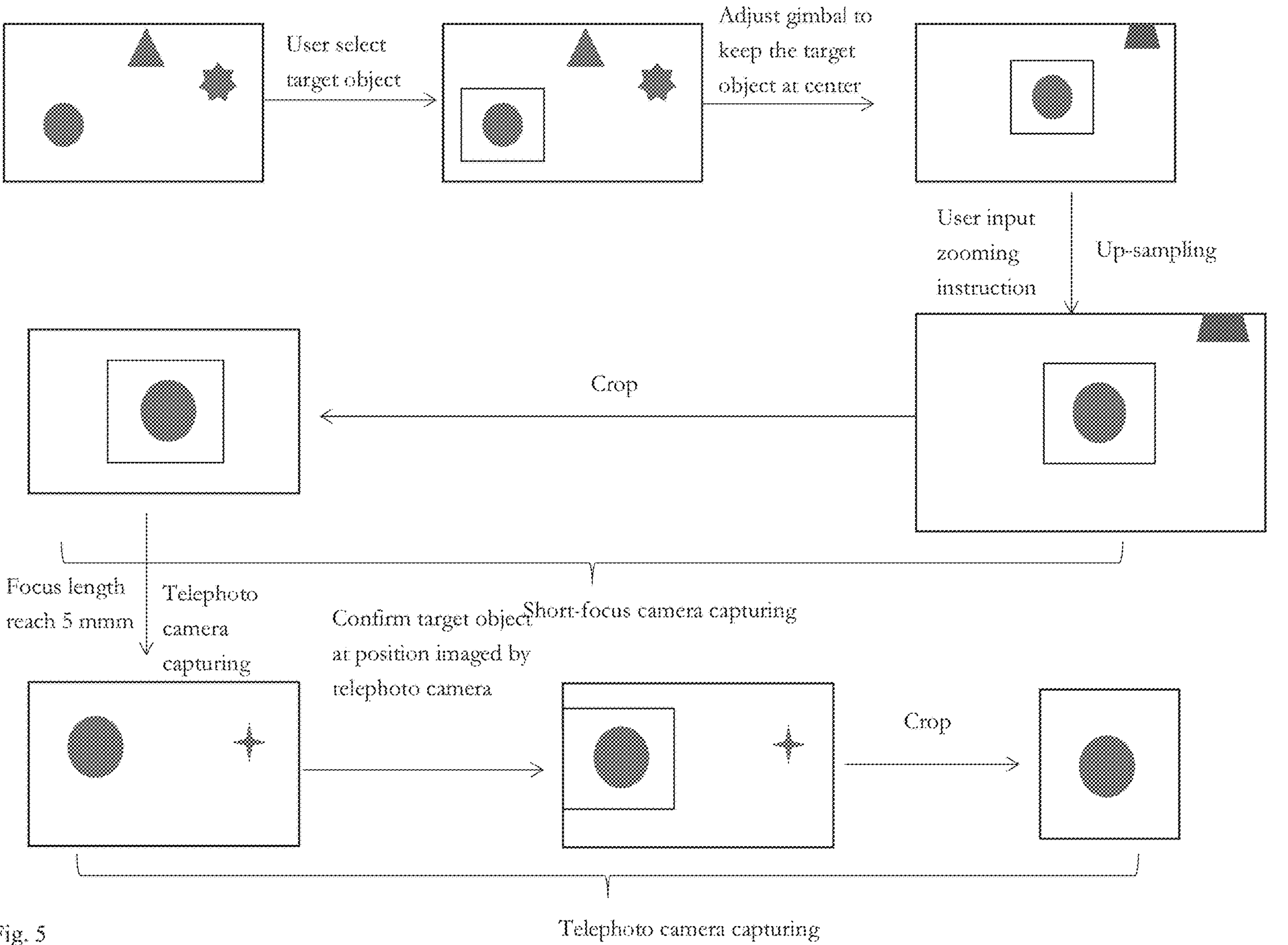
FIG. 5 is a schematic diagram of a zoom method according to an embodiment of the present application.

In one embodiment, a specific zooming process can be referred to in FIG. 5. The short-focus camera collects an image, sends it to the control terminal, and displays it to the user through an interactive interface of the control terminal. After seeing the target object to be observed in the image (e.g., a certain power equipment), the user can click or box the target object as the target object to be zoomed. After determining the target object selected by the user, the UAV can adjust the gimbal in real time to ensure that the target object is located at the center of the image captured by the short-focus camera. Since the two camera positions are generally not far apart, the target object located at the center of the short-focus camera is generally within the FOV of the telephoto camera, thus avoiding the problem of losing the target object after the camera is switched. After the user selects the target object to be zoomed, the user can input a zoom command to zoom the target object through the controls of the control terminal to enlarge the target object. Before the focal length indicated by the user reaches 5 mm, the image can always be captured by the short-focus camera, and then the image captured by the short-focus camera can be up-sampled and the up-sampled image can be cropped so that the target object is always located at the center of the image, and then the cropped image can be sent to the control terminal for displaying to the user.

The telephoto camera can be turned on when the focal length is adjusted to close to 5 mm or 5 mm, and then, the telephoto camera is utilized to capture images. A mapping relationship between the pixel points of the image captured by the short-focus camera and the image captured by the telephoto camera may be determined based on internal parameters of the short-focus camera, the telephoto camera, the relative position and posture (external parameters), and the distance between the target object and the drone (which may be measured by a distance measuring device in the drone). Then, the position of the target object in the image collected by the telephoto camera is determined based on the position of the target object in the image collected by the short-focus camera. Then, the image collected by the telephoto camera is cropped so that the target object is also located at the center of the image collected by the telephoto camera, and then the cropped image is sent to the control terminal for display to the user. In this way, even if the camera is switched, there is no problem of the screen jumping or the target being lost. After outputting the image captured by the telephoto camera, the gimbal can be controlled to rotate and adjust the position of the telephoto camera so that the target object is actually also at the center position of the field of view of the telephoto camera.

The process of switching from the telephoto camera to the short-focus camera is generally similar, first, the user can select the target object in the image captured by the telephoto camera, and then the gimbal can adjust the camera position so that the target object is located at the center of the telephoto camera. When the user inputs the zoom command to reduce the focal length, the image captured by the telephoto camera can be down-sampled and cropped to ensure that the target object in the image output to the user is at the center of the screen. When the focal length is reduced to 3 mm or close to 3 mm, at this time, the short-focus camera can be turned on, the short-focus camera can be utilized to collect the image, and then based on the relative position and posture of the two cameras and the distance between the target object and the drone, the mapping relationship of the images collected by the two cameras can be determined. Then, based on the mapping relationship, the position of the target object is determined in the image captured by the short-focus camera, and the image is cropped so that the target object is always kept at the center of the screen. At the same time, the gimbal can be adjusted so that the target object is actually also at the center of the short-focus camera.

Figure 6:
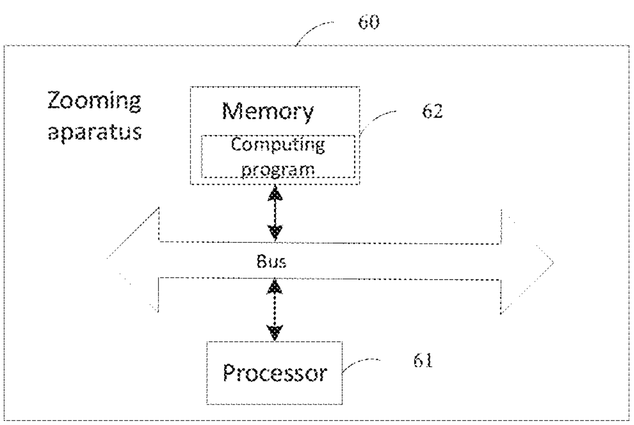
FIG. 6 is a schematic diagram of a logical structure of a zoom apparatus according to an embodiment of the present application.

Corresponding to the above zooming method, some embodiments of the present disclosure also provide a device for zooming an image capturing device, as shown in FIG. 6, wherein the image capturing device comprises at least a first camera and a second camera, wherein the focal length supported by the first camera is not exactly the same as the focal length supported by the second camera. The device may comprise a processor 61, a memory 62, a computer program stored in the memory 62 and executable by the processor 61, the processor 61 executing the computer program being capable of the following steps:

outputting a first image for displaying the first image to a user via a user interaction interface in the case where the current focal length of the image capturing device is the focal length supported by the first camera, the first image being captured via the first camera;

In the event that the current focal length of the image capturing device is switched from a focal length supported by the first camera to a focal length supported by the second camera, outputting a second image for displaying the second image to the user via the user interaction interface;

wherein the second image is obtained by the second camera, wherein the position of the target object in the second image is the same as the position of the target object in the first image, and wherein the target object is determined based on a target object selection command inputted by the user through the user interaction interface.

In some embodiments, both the first camera and the second camera are fixed focus cameras, and the first camera supports a different focal length than that the second camera supports.

In some embodiments, the first camera and the second camera are both zoom cameras, with the first camera and the second camera each supporting one or more focal lengths.

In some embodiments, the range of the focal length supported by the first camera and the range of the focal length supported by the second camera are seamlessly spliced or partially overlapped.

In some embodiments, the range of the focal length supported by the first camera and the range of the focal length supported by the second camera are seamlessly spliced. When the focal lengths of the first camera and the second camera are the same, there is at least a partial overlap of FOVs between the first camera and the second camera.

In some embodiments, the current focal length of the image capturing device switching from the focal length supported by the first camera to the focus length supported by the second camera comprises:

the focal length supported by the first camera is not smaller than the focal length supported by the second camera, and the zoom command directs switching the current focal length of the image capturing device from the minimum focal length supported by the first camera to the maximum focal length supported by the second camera; or the focal length supported by the first camera is not greater than that supported by the second camera, and the zoom command directs switching the focal length of the image capturing device from a maximum focal length supported by the first camera to a minimum focal length supported by the second camera.

In some embodiments, the first camera is a fixed focus camera, the first image is a first original image captured by the first camera, or the first image is obtained by performing an image transformation process on the first original image.

In some embodiments, that the first image is obtained by performing an image transformation process on the first original image comprises:

performing one or more of the following processes on the first original image to obtain the first image: an up-sampling process, a down-sampling process, or a cropping process.

In some embodiments, the target object is located at the center of the first image, the first image being obtained by the up-sampling process or the down-sampling process of the first original image followed by the cropping process.

In some embodiments, the second image is obtained based on:

obtaining a second original image captured by the second camera; and performing an image transformation process on the second original image to obtain the second image.

In some embodiments, the performing the image transformation process on the second original image to obtain the second image comprises:

determining a mapping relationship of the first image to the second original image based on a relative positional and postural relationship of the first camera and the second camera; and performing an image transformation process on the second original image based on the position of the target object in the first image and the mapping relationship to obtain the second image.

In some embodiments, performing an image transformation process on the second original image comprises:

performing one or more of the following processes on the second original image: an affine transformation process or a cropping process.

In some embodiments, the determining the mapping relationship of the first image to an original image captured by the second camera based on the relative positional and postural relationship of the first camera and the second camera comprises:

determining a distance between the target object and the image acquisition device; and determining the mapping relationship based on the relative positional and postural relationship and the distance.

In some embodiments, the image capture device is mounted on a gimbal, and after outputting the second image, the processor is also used to:

controlling the movement of the gimbal to drive the movement of the image capturing device such that the actual imaging position of the target object in the second camera corresponds to the position of the target object displayed in the second image.

In some embodiments, after outputting the second image, the processor is further used to:

in response to a zoom command subsequently input by the user, a plurality of frames of second original images captured by the second camera are processed and output, such that the position of the target object in each of the plurality of frames of the processed second original images is gradually restored from the position of the target object in the second image to the actual imaging position of the target object in the second camera.

In some embodiments, the processor is also used for:

prior to performing a zoom on the image capture device, a target area is identified in the user interaction interface to prompt the user to adjust the position of the image capture device such that the target object is located within the target area, wherein when the target object is located within the target area, the target object is located within the FOV of the second camera.

In some embodiments, the image capturing device is mounted on a gimbal, and the device is also used for:

prior to zooming the image capture device, controlling the movement of the gimbal to adjust the position of the image capture device such that the target object is located within the FOV of the second camera.

In some embodiments, the target object is located at the center of the first image and the second image.

In some embodiments, the image capturing device is mounted on a gimbal, and after outputting the second image, the processor is also used to:

control the movement of the gimbal to drive the image capturing device so that the target object is always at the center of the second original image captured by the second camera.

In some embodiments, the user interaction interface comprises a user interaction interface on the image acquisition device, or a user interaction interface on a control terminal for controlling the image acquisition device.

In some embodiments, the current focal length of the image capturing device is determined based on a zoom command entered by a user, the zoom command being based on a control input on the image capturing device or on a control terminal, the control terminal being used to control the image capturing device.

In addition, some embodiments of the present disclosure provide another device for zooming an image capture device, the image capture device comprising at least a first camera and a second camera, the first camera supporting a focal length not identical to that supported by the second camera, the device comprising a processor, a memory, and a computer program stored in the memory to be executed by the processor, the processor executing the computer program may realize the following steps:

determining a target object from a first image based on a target object selection command input by a user, the first image being obtained by the first camera;

In the event that the current focal length of the image capturing device is switched from a focal length supported by the first camera to a focal length supported by the second camera, determining a mapping relationship between the first image and an original image captured by the second camera based on a relative positional and postural relationship between the first camera and the second camera; and processing the original image based on the position of the target object in the first image and the mapping relationship to obtain a second image and outputting it such that the position of the target object in the second image is the same as the position of the target object in the first image.

Accordingly, some embodiments of the present specification further provide a computer storage medium, the storage medium having a program stored therein, the program being executed by a processor to implement the zooming method of the image capture device of any of the above embodiments.

Embodiments of the present disclosure may take the form of a computer program product implemented on one or more storage media (including, but not limited to, disk memory, CD-ROM, optical memory, and the like) containing program code therein. Computer usable storage media include permanent and non-permanent, removable and non-removable media, and may be implemented by any method or technique for information storage. The information may be computer-readable commands, data structures, modules of a program, or other data. Examples of storage media for computers include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only CD-ROM only Read-Only Memory (CD-ROM), Digital Versatile Disc (DVD) or other optical storage, magnetic cartridge tapes, magnetic tape disk storage or other magnetic storage devices, or any other non-transport media that can be used to store information that can be accessed by computing devices.

For a device embodiment, since it corresponds essentially to the method embodiment, it is sufficient to refer to a portion of the description of the method embodiment where relevant. The above-described device embodiments are merely schematic, wherein the units described as illustrated as separated components may or may not be physically separated, and the components shown as units may or may not be physical units, i.e., they may be located in one place or may be distributed to a plurality of network units. Some or all of these modules may be selected to fulfill the purpose of the embodiment schemes according to actual needs. It can be understood and implemented by a person of ordinary skill in the art without creative labor.

It should be noted that, in this disclosure, relational terms such as first and second are used only to distinguish one entity or operation from another, and do not necessarily require or imply the existence of any such actual relationship or order between those entities or operations. The terms "including", "comprising", or any other variant thereof, are intended to cover non-exclusive inclusion, so that a process, method, article or apparatus comprising a set of elements includes not only those elements, but also other elements that are not expressly enumerated, or that a process, method, article or apparatus comprising a set of elements for such a process, method, article or apparatus is also included. Or it also includes elements that are inherent to such process, method, article or apparatus. Without further limitation, the fact that an element is defined by the phrase "includes a . . . " does not preclude the existence of another identical element in the process, method, article or apparatus that includes the element.

The method and apparatus provided by the embodiments of the present invention are described in detail above, and specific examples are applied herein to elaborate on the principles and implementation of the present disclosure, and the description of the above embodiments is only used to help understand the method of the present invention and its core ideas; at the same time, for one of the ordinary skill in the art, based on the ideas of the present disclosure, there will be changes in the specific implementations and the scope of the application. In summary, the contents of this specification should not be construed as a limitation of the present disclosure.

The foregoing is only a specific embodiment of the present disclosure, but the scope of protection of the present disclosure is not limited thereto, and any person skilled in the art can easily think of various equivalent modifications or substitutions within the scope of the technology disclosed in the present disclosure, which shall be covered by the scope of protection of the present disclosure. Therefore, the scope of protection of this disclosure shall be subject to the scope of protection of the claims.

What is claimed is:

1. An apparatus for zooming an image capturing device, comprising at least one processor, and at least one memory, the memory storing a computer program executable by the processor, the processor executing the computer program to:

output a first image collected by a first camera of the image capturing device, wherein the first camera has a first focal length;

control switching of the current focal length of the image capturing device from the first focal length supported by the first camera to a second focal length supported by a second camera of the image capturing device; and output a second image collected by the second camera while maintaining a position of a target object in the second image to be same as a position of the target object in the first image, wherein:

the first focal length and the second focal length are not identical; and maintaining the position of the target object in the second image to be same as the position of the target object in the first image includes:

performing an affine transformation processing or a cropping processing on a second original image captured by the second camera to obtain the second image, to cause the position of the target object in the second image to be same as the target object in the first image; or controlling a gimbal to drive the image capturing device to move, to cause an actual imaged position of the target object in the second camera to correspond to the position of the target object in the first image, the image capturing device being carried by the gimbal.

2. The apparatus according to claim 1, wherein the target object is determined based on a target object selection instruction.

3. The apparatus according to claim 1, wherein:

the first camera and the second camera are both fixed-focus cameras, and the first focal length supported by the first camera is different from the second focal length supported by the second camera; or the first camera and the second camera are both zoom cameras, and the first camera supporting one or more first focal lengths and the second camera supporting one or more second focal lengths.

4. The apparatus according to claim 3, wherein the first camera and the second camera are both zoom cameras, and the first focal lengths supported by the first camera and the second focal lengths supported by the second camera are seamlessly spliced or partially overlapped.

5. The apparatus according to claim 3, wherein the first camera and the second camera are both zoom cameras, the first focal lengths supported by the first camera and the second focal lengths supported by the second camera are seamlessly spliced, and the first camera and the second camera have at least partially overlapping viewing angles when the first camera and the second camera have the same focal length.

6. The apparatus according to claim 3, wherein the current focal length of the image capturing device is switched from the first focal lengths supported by the first camera to the second focal lengths supported by the second camera, comprising:

in a case that the first focal lengths are not less than the second focal lengths, a zoom instruction directs switching the current focal length of the image capturing device from a minimum first focal length supported by the first camera to a maximum second focal length supported by the second camera; or in a case that the first focal lengths are not greater than the second focal lengths, the zoom instruction directs switching the current focal length of the image capturing device from a maximum first focal length supported by the first camera to a minimum second focal length supported by the second camera.

7. The apparatus according to claim 1, wherein:

the first camera is a fixed focus camera and the first image is a first original image captured by the first camera; or the first image is obtained by performing an image transformation process on the first original image.

8. The apparatus according to claim 7, wherein that the first image is obtained by performing the image transformation process on the first original image comprises:

performing one or more of following processes on the first original image to obtain the first image: an up-sampling process, a down-sampling process, and/or a cropping process.

9. The apparatus according to claim 7, wherein the target object is located at a center of the first image, and the first image is obtained by an up-sampling processing or a down-sampling processing of the first original image followed by a cropping processing.

10. The apparatus according to claim 1, wherein performing the affine transformation processing or the cropping processing on the second original image to obtain the second image comprises:

performing the affine transformation processing or the cropping processing on the second original image based on the position of the target object in the first image and a relative positional and postural relationship of the first camera and the second camera.

11. The apparatus according to claim 10, wherein the processor further executes the computer program to:

determine the relative positional and postural relationship between the first camera and the second camera;

determine a distance of the target object from the image capturing device; and determine a mapping relationship based on the relative positional and postural relationship and the distance.

12. The apparatus according to claim 1, wherein, after outputting the second image, the processor further executes the computer program to:

in response to a subsequent zoom command, process and output a plurality of frames of the second original image captured by the second camera, such that the position of the target object in the plurality of frames of the processed second original image is gradually restored from the position of the target object in the second image to the actual imaged position of the target object in the second camera.

13. The apparatus according to claim 1, wherein the processor further executes the computer program to:

prior to zooming the image capturing device, identify a target area in a user interaction interface to prompt a user to adjust a position of the image capturing device such that the target object is located within the target area, wherein when the target object is located within the target area, the target object is located within a viewing angle of the second camera.

14. The apparatus according to claim 1, wherein the processor further executes the computer program to:

prior to zooming the image capturing device, control the gimbal to adjust a position of the image capturing device such that the target object is located within a viewing angle of the second camera.

15. The apparatus according to claim 1, wherein:

the target object is located at a center of the first image and a center of the second image, respectively; and the processor further executes the computer program to control the gimbal to drive the image capturing device so that the target object remains at the center of the second original image captured by the second camera.

16. The apparatus according to claim 1, further comprising:

in response to a zoom command to adjust a focal length of the image capture device to be the first focal length, output the first image on the display screen with a size of the entire display screen, wherein the first camera is a fixed-focus camera with the first focal length; and in response to a zoom command to adjust the focal length of the image capture device to be equal to the second focal length, output the second image on the display screen with the size of the entire display screen, wherein the second camera is a fixed-focus camera with the second focal length, and the first focal length is smaller than the second focal length.

17. The apparatus according to claim 1, wherein:

the first camera is a fixed focus camera with the first focal length;

outputting the first image includes:

in response to a zoom command to adjust a focal length of the image capture device to be smaller than the first focal length, performing a down-sampling process on a first original image captured by the first camera to obtain the first image, and outputting the first image on a display screen with the size of the entire display screen; and in response to a zoom command to adjust the focal length of the image capture device to be greater than the first focal length and smaller than the second focal length, performing an up-sampling process on the first original image to obtain the first image, and outputting the first image on the display screen with the size of the entire display screen.

18. The apparatus according to claim 1, wherein the second image is obtained by:

obtaining the second original image captured by the second camera; and performing the affine transformation process on the second original image to straighten the target object that is tilted in the second original image, to obtain the second image.

19. A method of zooming an image capturing device, comprising:

outputting a first image collected by a first camera of an image capturing device with a first size, wherein the first camera has a first focal length;

controlling switching of the current focal length of the image capturing device from the first focal length supported by the first camera to a second focal length supported by a second camera of the image capturing device; and outputting a second image collected by the second camera with a second size while maintaining a position of a target object in the second image to be same as a position of the target object in the first image, the first size being same as the second size, wherein:

the first focal length and the second focal length are not identical; and maintaining the position of the target object in the second image to be same as the position of the target object in the first image includes:

performing an affine transformation processing or a cropping processing on a second original image captured by the second camera to obtain the second image, to cause the position of the target object in the second image to be same as the target object in the first image; or controlling a gimbal to drive the image capturing device to move, to cause an actual imaged position of the target object in the second camera to correspond to the position of the target object in the first image, the image capturing device being carried by the gimbal.

20. An apparatus for zooming an image capturing device, comprising at least one processor, and at least one memory, the memory storing a computer program executable by the processor, the processor executing the computer program to:

output, on a display screen, a first image collected by a first camera of the image capturing device, wherein the first camera has a first focal length;

control switching of the current focal length of the image capturing device from the first focal length supported by the first camera to a second focal length supported by a second camera of the image capturing device; and after the first image is output on the display screen, output, on the display screen, a second image collected by the second camera to replace the first image while maintaining a position of a target object in the second image to be same as a position of the target object in the first image, the first image being no longer output on the display screen after the second image is output to replace the first image;

wherein:

the first focal length and the second focal length are not identical; and maintaining the position of the target object in the second image to be same as the position of the target object in the first image includes:

performing an affine transformation processing or a cropping processing on a second original image captured by the second camera to obtain the second image, to cause the position of the target object in the second image to be same as the target object in the first image; or controlling a gimbal to drive the image capturing device to move, to cause an actual imaged position of the target object in the second camera to correspond to the position of the target object in the first image, the image capturing device being carried by the gimbal.

* * * * *